UNITED STATES PATENT OFFICE.

JOSEPH FLANNERY, OF PHILADELPHIA, PENNSYLVANIA.

BRICK FOR GAS-RETORTS.

SPECIFICATION forming part of Letters Patent No. 247,329, dated September 20, 1881.

Application filed December 20, 1880. (No specimens.)

*To all whom it may concern:*

Be it known that I, JOSEPH FLANNERY, of Philadelphia, in the State of Pennsylvania, have invented certain new and useful Improvements in Bricks for Gas-Retorts; and I do hereby declare the following to be a full, clear, and exact description of the invention, such as will enable others skilled in the art to which it pertains to make and use it.

My invention relates to an improvement in the manufacture of bricks for gas-retorts and furnaces; and it consists in adding to the silicate of alumina, from which the bricks are made, ten per cent. of graphite or other dense carbonaceous material, as will be more fully described hereinafter.

Where the bricks which are used in gas furnaces, retorts, and other such places are made of silicate of alumina, they absorb a portion of the carbon or olefiants of the gas, and thus become carbonized or saturated with carbon, and detract from the illuminating qualities of the gas. In order to prevent this absorption and the vitrification of the surfaces of the linings of furnaces and retorts, I add to the silicate of alumina in the manufacture of bricks or refractory material used in the lining of furnaces or retorts ten or more per cent. of graphite or other densely carbonaceous material. This carbonaceous material prevents the vitrification of the bricks or linings, and greatly increases the durability of the linings.

I am aware that plumbago or black-lead, together with other substances, has been mixed with the material out of which crucibles are made, and this I disclaim. Never, however, has a carbonaceous substance been mixed with the silicate of alumina, out of which bricks are made for the construction of gas furnaces and retorts.

Having thus described my invention, I claim—

In the manufacture of bricks to be used in gas-retorts and furnaces, a compound composed of nine parts silicate of alumina and one part graphite, substantially as set forth.

In testimony that I claim the foregoing I have hereunto set my hand this 13th day of December, 1880.

JOSEPH FLANNERY.

Witnesses:
CHRISTIAN VOGT,
J. M. POULSON.